(12) United States Patent
Staller

(10) Patent No.: US 6,956,623 B1
(45) Date of Patent: Oct. 18, 2005

(54) METHOD AND SYSTEM FOR AUTOMATICALLY SCANNING TELEVISION CHANNELS

(75) Inventor: Joshua D. Staller, Littleton, CO (US)

(73) Assignee: AT&T Corp., New York, NY (US)

( * ) Notice: Subject to any disclaimer, the term of this patent is extended or adjusted under 35 U.S.C. 154(b) by 579 days.

(21) Appl. No.: 09/939,927

(22) Filed: Aug. 27, 2001

(51) Int. Cl.[7] ............................................. H04N 5/50
(52) U.S. Cl. ..................................... 348/731; 348/732
(58) Field of Search ............................... 348/731, 732, 348/733, 569, 570; 725/28, 46, 47; H04N 5/50

(56) References Cited

U.S. PATENT DOCUMENTS

| | | | |
|---|---|---|---|
| 5,005,084 A * | 4/1991 | Skinner .................... | 348/734 |
| 5,034,819 A | 7/1991 | Tsukagoshi | |
| 5,673,089 A * | 9/1997 | Yuen et al. .................... | 725/38 |
| 5,719,637 A | 2/1998 | Ohkura et al. | |
| 5,805,235 A | 9/1998 | Bedard | |
| 6,084,645 A | 7/2000 | Park et al. | |
| 6,118,498 A * | 9/2000 | Reitmeier .................... | 348/725 |
| 6,198,513 B1 * | 3/2001 | Cherrick .................... | 348/731 |

* cited by examiner

*Primary Examiner*—Michael H. Lee
(74) *Attorney, Agent, or Firm*—Brooks Kushman P.C.

(57) ABSTRACT

A method and system for automatically scanning channels of a television operable for displaying channels of a channel lineup one at a time includes a television input device. The television input device is operable for being controlled by a viewer to enable the viewer to control the television to change the channels being displayed by the television. The television input device is operable with the television to automatically change the channels being displayed by the television such that each channel in the channel lineup is displayed one at a time by the television for a channel display time period until the viewer controls the television input device to stop the television from changing the channels.

18 Claims, 2 Drawing Sheets

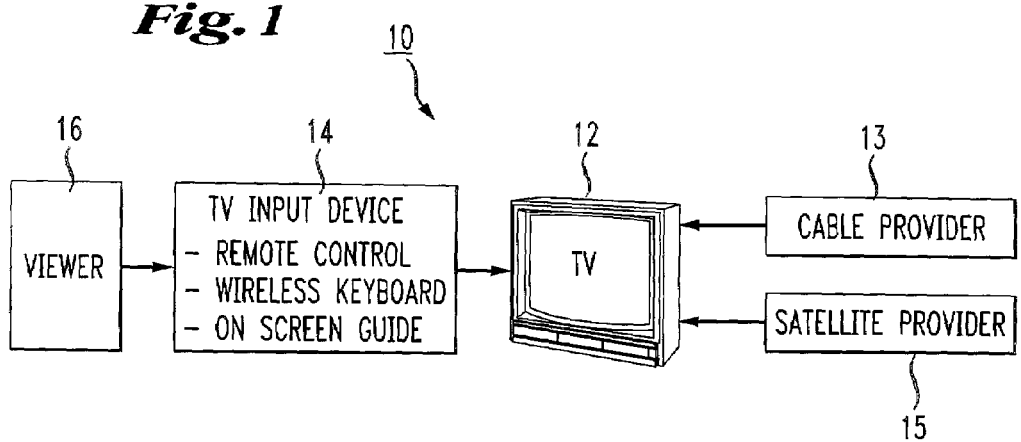
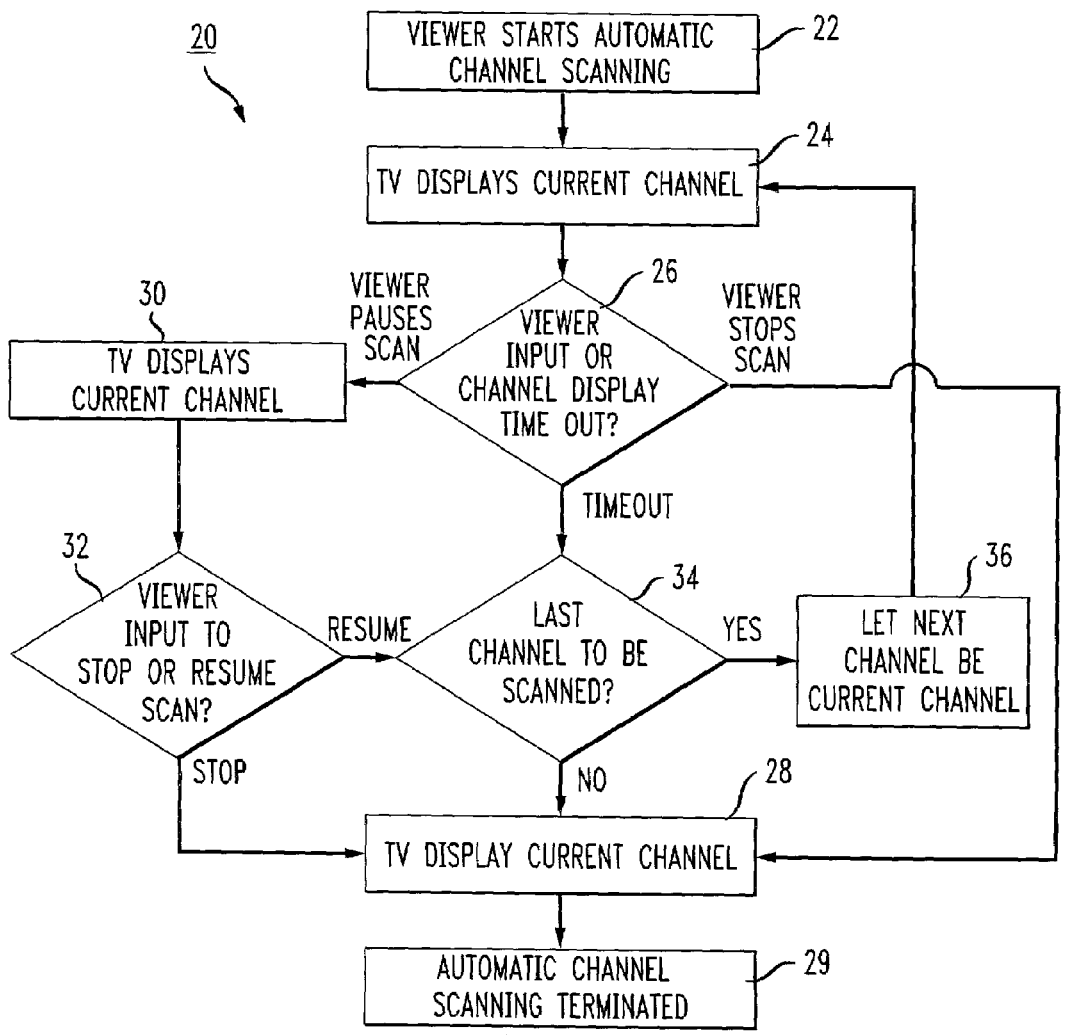

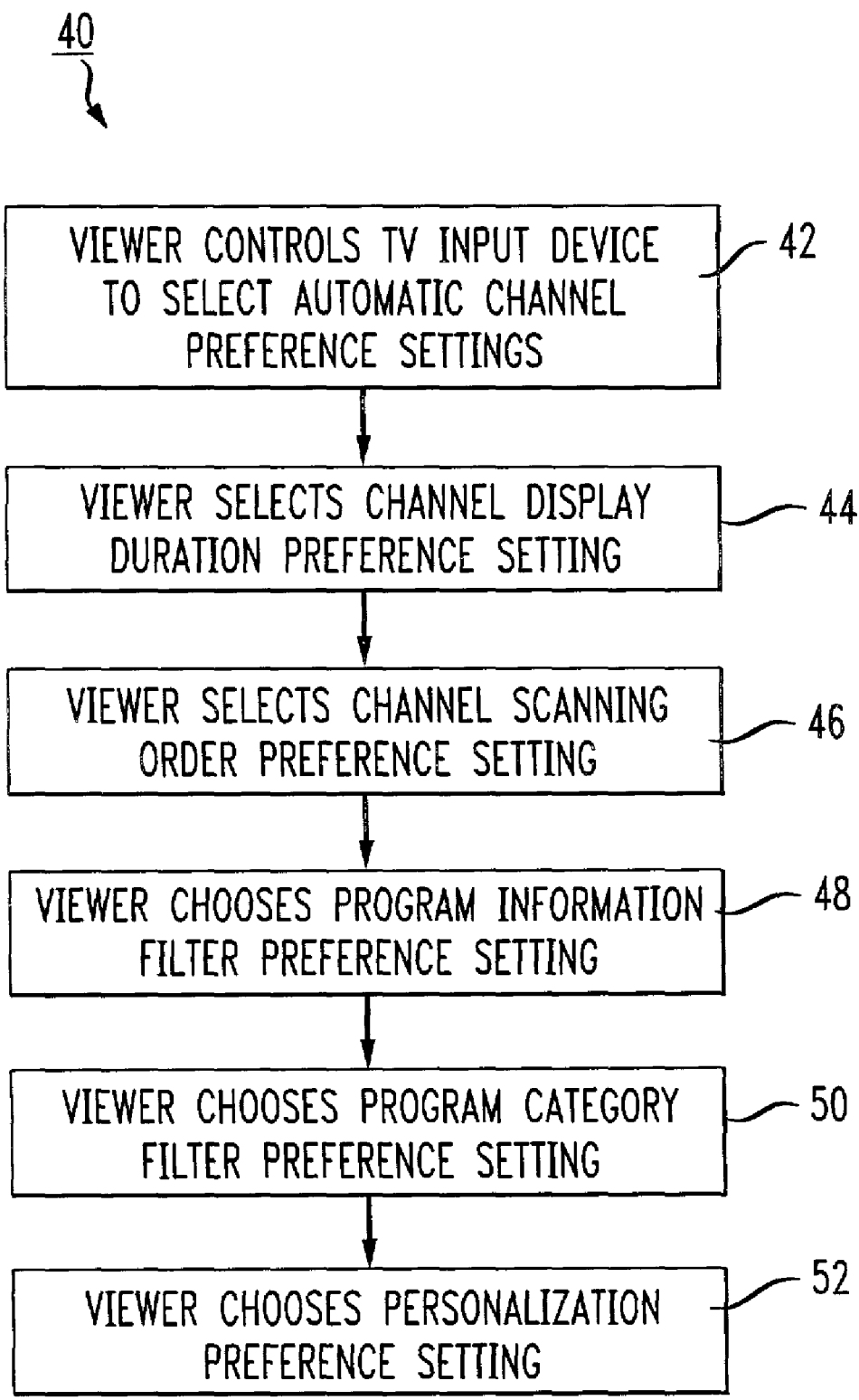

METHOD AND SYSTEM FOR AUTOMATICALLY SCANNING TELEVISION CHANNELS

TECHNICAL FIELD

The present invention is generally related to methods and systems for scanning television (TV) channels and, more particularly, to methods and systems for automatically scanning TV channels.

BACKGROUND ART

Cable and satellite providers offer hundreds of television (TV) channels to their subscribers. Typically, a viewer uses a standard TV input device to control a TV in order to select a desired channel from the multitudes of channels for viewing. Standard TV input devices include remote controls, wireless keyboards, onscreen guides, or a combination thereof. In response to a viewer selecting a channel by using a standard input TV device, the TV changes the current channel being displayed by the TV to the selected channel for viewing by the viewer.

This procedure works well if the viewer knows which channel the viewer desires to view. A problem is that many times the viewer does not know which channel to select because the viewer is not sure of the content being shown by the channels or the viewer may want to surf through the channels to view the available content for entertainment. In this instance, the viewer uses a standard TV input device to scan through the channels until a desired channel is located. For example, the viewer physically controls a remote control by pressing up/down channel keys to enter a first channel, then a second channel, then a third channel, and so on until a desired channel is located. The viewer may also control the remote control by entering channel numbers in a sequential, random, or logical order to scan through the channels until a desired channel is located. A problem with this procedure is that the viewer must physically control the remote control or other standard TV input device to scan through the channels until a desired channel is located. As can be appreciated, if there are many available channels to scan through then physically controlling a standard TV input device to scan through the channels in order to locate programming of interest is inefficient and takes much attention from the viewer.

SUMMARY OF THE INVENTION

Accordingly, it is an object of the present invention to provide a method and system for automatically scanning through television (TV) channels.

It is another object of the present invention to provide a method and system which use standard TV input devices for automatically scanning through TV channels.

It is a further object of the present invention to provide a method and system which use standard TV input devices for automatically scanning through a logical subset of TV channels.

It is still another object of the present invention to provide a method and system which use standard TV input devices for automatically scanning through TV channels in accordance with selectable scanning preference settings.

It is still a further object of the present invention to provide a method and system which use standard TV input devices for automatically scanning through TV channels in accordance with selectable scanning preference settings uniquely associated with different viewers.

In carrying out the above objects and other objects, the present invention provides a system for automatically scanning channels of a television operable for displaying a plurality of channels of a channel lineup one at a time. The system includes a television input device operable for being controlled by a viewer to enable the viewer to control the television to change the channels being displayed by the television. The television input device is operable with the television to automatically change the channels being displayed by the television such that each channel in the channel lineup is displayed one at a time by the television for a channel display time period until the viewer controls the television input device to stop the television from changing the channels.

The television input device may be a remote television input device operable for being controlled by the viewer to enable the viewer to remotely control the television. The television input device may include a remote control, a wireless keyboard, or an onscreen keyboard.

The television input device is operable with the television to pause the television from automatically changing the channels in response to the viewer controlling the television input device to pause the channel changing. The television input device is further operable with the television to resume the television to continue automatically changing the channels in response to the viewer controlling the television input device to resume the channel changing.

The television input device is operable to enable the viewer to select the channel display time period, select the order in which the channels are automatically changed, select whether program information associated with each channel is displayed by the television with each displayed channel, select a subset of the channels in the channel lineup to be automatically changed, and associate preference settings with the viewer such that the television input device automatically changes the channels in accordance with the preference settings associated with the viewer.

Further, in carrying out the above objects and other objects, the present invention provides a method for automatically scanning channels of a television operable for displaying a plurality of channels of a channel lineup one at a time. The method includes controlling a television input device operable for enabling a viewer to automatically change the channels being displayed by the television such that each channel in the channel lineup is displayed one at a time by the television for a channel display time period without further action by the viewer. The method further includes controlling the television input device to stop the television from automatically changing the channels.

The advantages associated with the method and system of the present invention are numerous. The method and system of the present invention enable hands-free, automatic channel scanning of all channels, or a logical subset of channels, in the channel lineup. The method and system of the present invention is more convenient (i.e., hands-free and automatic), more flexible (i.e., viewers can scan all channels or a logical subset of channels), more personal (i.e., different preference settings can be associated with different viewers), and more entertaining (i.e., viewers can scan up, down, or randomly through the channel lineup) than available manual channel scanning methods and systems.

The above objects and other objects, features, and advantages of the present invention are readily apparent from the following detailed description of the best mode for carrying out the present invention when taken in connection with the accompanying drawings.

BRIEF DESCRIPTION OF THE DRAWINGS

FIG. 1 illustrates a block diagram of a system in accordance with a preferred embodiment of the present invention;

FIG. 2 illustrates a flow chart describing the general operation of the method and system of the present invention; and FIG. 3 illustrates a flow chart describing enhanced features of the method and system of the present invention.

DETAILED DESCRIPTION OF THE PREFERRED EMBODIMENT(S)

Referring now to FIG. 1, a system 10 in accordance with a preferred embodiment of the present invention is shown. System 10 includes a television (TV) 12 and a TV input device 14. TV 12 is operable for displaying TV channels which may be provided by a cable provider 13 or a satellite provider 15. Preferably, TV 12 displays one channel at a time. However, TV 12 may be more advanced by being able to display more than one channel at a time and have such capabilities as the picture-in-picture feature. TV input device 14 is embodied as a standard TV input device such as a remote control, a wireless keyboard, an onscreen guide, and the like. TV input device 14 is operable to enable a viewer 16 to control the features of TV 12. TV input device 14 may control TV 12 directly or indirectly through the use of a set-top box or the like.

For instance, viewer 16 may control TV input device 14 to raise or lower the volume of TV 12, turn on and off the TV, and control other features such as color, tint, stereo sound, etc., associated with the TV. Viewer 16 may also control TV input device 14 to change the channels of TV 12. In accordance with the method and system of the present invention, TV input device 14 is operable for controlling TV 12 to automatically scan through the channels or a logical subset of the channels. Viewer 16 controls TV input device 14 to perform the automatic channel scanning.

In general, the automatic channel scanning feature provided by TV input device 14 allows viewer 16 to initiate a hands-free, automatic, serial display of all channels, or a logical subset of channels, in the channel lineup provided by TV 12. In operation, TV 12 automatically displays each channel in a channel lineup one at a time for a predetermined time period for viewer 16 to view during the automatic channel scanning. The channel lineup may include all of the channels provided by TV 12 or may just include a selected list of the channels provided by the TV. TV input device 14 is operable to enable viewer 16 to select a subset of the channels for the channel lineup. For instance, viewer 16 may define a channel lineup to be just all of the sports or news content channels. In this case, TV 12 automatically displays each sports or news content channel in the channel lineup one at a time for viewer 16 to view during the automatic channel scanning.

Viewer 16 controls TV input device 14 to start, pause, resume, and stop automatic channel scans. Viewer 16 starts the automatic channel scanning to have the channels be automatically scanned. Viewer 16 pauses the automatic channel scanning to temporarily suspend the automatic channel scanning such that the current channel being displayed by TV 12 is displayed until the viewer desires to move on to the next channel. Viewer 16 resumes the automatic channel scanning to continue with the automatic channel scanning after it has been paused. Viewer 16 stops the automatic channel scanning so that TV 12 does not change the current channel being displayed until further input from the viewer.

Referring now to FIG. 2, a flow chart 20 describing operation of the method and system of the present invention is shown. Flow chart 20 begins with viewer 16 controlling TV input device 14 to start the automatic channel scanning as shown in block 22. TV 12 then displays the current channel in the channel lineup as shown in block 24 for a predetermined channel display time period. The current channel may be the channel that was being displayed by TV 12 prior to the initiation of the automatic channel scanning or may be a predefined channel that automatically becomes the current channel once the automatic channel scanning is initiated. TV 12 then may display a visual indicator informing viewer 16 that the automatic channel scanning is in progress.

TV input device 14 then waits for viewer input or a channel display timeout as shown in decision block 26. The input from viewer 16 may be to pause or stop the automatic channel scanning. If viewer 16 controls TV input device 14 to stop the automatic channel scanning at decision block 26, then the TV input device controls TV 12 to continue to display the current channel as shown in block 28 and the automatic channel scanning is terminated as shown in block 29. While the automatic channel scanning is stopped, TV 12 may display a visual indicator informing viewer 16 that the automatic channel scanning is stopped.

If viewer 16 controls TV input device 14 to pause the automatic channel scanning at decision block 26, then TV input device controls TV 12 to continue to display the current channel as shown in block 30. While the automatic channel scanning is paused, TV 12 may display a visual indicator informing viewer 16 that the automatic channel scanning is paused. TV input device 14 then waits for viewer 16 to either stop or resume the automatic channel scanning as shown in decision block 32. If viewer 16 controls TV input device 14 to stop the automatic channel scanning at decision block 32, then the TV input device controls TV 12 to continue to display the current channel as shown in block 28 and the automatic channel scanning is terminated as shown in block 29.

If the channel display timeout occurs at decision block 26 or viewer 16 resumes the automatic channel scanning at decision block 32, then TV input device 14 determines if the current channel is the last channel to be scanned in the channel lineup as shown in decision block 34. When viewer 16 resumes the automatic channel scanning, TV 12 may display a visual indicator informing the viewer that the automatic channel scanning has been resumed. If the current channel is the last channel in the channel lineup to be scanned, then the TV input device controls TV 12 to continue to display the current channel as shown in block 28 and the automatic channel scanning is terminated as shown in block 29.

If the current channel is not the last channel in the channel lineup to be scanned (i.e., there are more channels in the channel lineup which have not yet been displayed by TV 12), then TV input device 14 controls the TV to let the next channel in the channel lineup be the current channel as shown in block 36. For example, the current channel being displayed by TV 12 may be channel #1. The next channel in the channel lineup may be channel #2. At block 36, TV input device 14 controls TV 12 to replace channel #1 with channel #2 such that channel #2 is now the current channel. TV 12 then displays the current channel as shown in block 24 and the above-identified process is then repeated until the automatic channel scanning has been stopped. The automatic channel scanning may be terminated by viewer 16 controlling TV input device 14 to stop TV 12 from automatically changing the channels or by being automatically stopped once all of the channels in the channel lineup have been displayed by the TV. Of course, the automatic channel scanning may continue indefinitely after all of the channels in the channel lineup have been displayed by TV 12.

Referring now to FIG. 3, a flow chart 40 describing enhanced features of the method and system of the present invention is shown. Flow chart 40 begins with viewer 16 controlling TV input device 14 to select automatic channel scanning preference settings as shown in block 42. Viewer 16 selects the preference settings to control various features of the automatic channel scanning. The preference settings include channel display duration, channel scanning order, program information filter, program category filter, and personalization.

Viewer 16 selects the channel display duration preference setting as shown in block 44 to select the channel display time period each channel in the channel lineup will be displayed by TV 12 during the automatic channel scanning. For example, the channel display time period may be five, ten, or twenty seconds. After the expiration of the channel display time period, TV input device 14 controls TV 12 to display the next channel in the channel lineup for the channel display time period if there are more channels to be scanned and if viewer 16 has not paused or stopped the automatic channel scanning.

Viewer 16 selects the channel scanning order preference setting as shown in block 46 to set whether the channels in the channel lineup will be scanned in an ascending or descending channel order or a random channel order. The default is to scan the channels in an ascending order. Viewer 16 chooses the program information filter preference setting as shown in block 48 to choose whether or not to have available program information be displayed by TV 12 as each channel in the channel lineup is scanned. The default is to display available program information.

Viewer 16 chooses the program category filter preference setting as shown in block 50 to select whether to scan all channels or only channels displaying a certain type of content (i.e., movies, sports, news, etc.). The default is to scan all of the channels in the channel lineup. Viewer 16 chooses the personalization preference setting as shown in block 52 to choose whether to personalize any of the described preference settings for the viewer. The default is to assign the same preference settings for all of the viewers.

Thus it is apparent that there has been provided, in accordance with the present invention, a method and system which use standard TV input devices for automatically scanning through TV channels that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives.

What is claimed is:

1. A system for automatically scanning channels of a television operable for displaying a plurality of channels of a channel lineup one at a time, the system comprising:

a television input device operable for being controlled respectively by viewers to enable the viewers to control the television to change the channels being displayed by the, television;

wherein the television input device is operable to enable each viewer to associate preference settings of the viewer with the television input device, the preference settings for each viewer including channel display time period, channel scanning order, and program category filter preference settings;

wherein the television input device in response to being controlled by a first one of the viewers is operable with the television to automatically change the channels being displayed by the television without any further viewer control of the television input device such that each channel in the channel lineup having content satisfying the first viewer's program category filter preference setting is automatically displayed, in accordance with the first viewer's channel scanning order preference setting, one at a time by the television for the duration of the first viewer's channel display time period.

2. The system of claim 1 wherein:

the television input device is operable with the television to automatically change the channels being displayed by the television until one of the viewers controls the television input device to stop the television from changing the channels.

3. The system of claim 1 wherein:

the television input device is a remote television input device operable for being controlled respectively by the viewers to enable the viewers to remotely control the television.

4. The system of claim 1 wherein:

the television input device includes a remote control.

5. The system of claim 1 wherein:

the television input device includes a wireless keyboard.

6. The system of claim 1 wherein:

the television input device includes an onscreen keyboard.

7. The system of claim 1 wherein:

the television input device is operable with the television to pause the television from automatically changing the channels in response to one of the viewers controlling the television input device to pause the channel changing.

8. The system of claim 7 wherein:

the television input device is operable with the television to resume the television to continue automatically changing the channels in response to one of the viewers controlling the television input device to resume the channel changing.

9. The system of claim 1 wherein:

the preference settings for each viewer further include a program information preference setting, wherein the television input device is operable with the television to display program information associated with each displayed channel in accordance with the viewer's program information preference setting.

10. The system of claim 1 wherein:

the television input device is operable to enable the viewers to select a subset of the channels in the channel lineup to be automatically changed.

11. A method for automatically scanning channels of a television operable for displaying a plurality of channels of a channel lineup one at a time, the method comprising:

associating preference settings of viewers of the television with a television input device, the preference settings for each viewer including channel display time period, channel scanning order, and program category filter preference settings, wherein the television input device is operable for being controlled respectively by viewers to enable the viewers to control the television to change the channels being displayed by the television;

a first one of the viewers controlling the television input device to have the television automatically change the channels being displayed by the television such that each channel in the channel lineup having content satisfying the first viewer's program category filter preference setting is automatically displayed, in accordance with the first viewer's channel scanning order preference setting, one at a time by the television for the duration of the first viewer's channel display time period without further action by the viewer; and any one of the viewers controlling the television input device to stop the television from automatically changing the channels.

12. The method of claim 11 wherein:

the television input device is a remote television input device operable for being controlled by the viewers to enable the viewers to remotely control the television.

13. The method of claim 11 wherein:

the television input device includes a remote control.

14. The method of claim 11 wherein:

the television input device includes a wireless keyboard.

15. The method of claim 11 wherein:

the television input device includes an onscreen keyboard.

16. The method of claim 11 further comprising:

any one of the viewers controlling the television input device to pause the television from automatically changing the channels.

17. The method of claim 16 further comprising:

any one of the viewers controlling the television input device to resume the television to continue automatically changing the channels.

18. The method of claim 11 wherein the preference settings for each viewer further include a program information preference setting, wherein the television displays the program information associated with each displayed channel in accordance with the viewer's program preference setting as the channels are being automatically changed.

* * * * *